… … …

2,886,504

PLUTONIUM-CERIUM-COPPER ALLOYS

Arthur S. Coffinberry, Los Alamos, N. Mex., assignor to the United States of America as represented by the United States Atomic Energy Commission No Drawing. Application September 9, 1958
Serial No. 760,047

3 Claims. (Cl. 204—193.2)

The present invention relates to alloys of plutonium and, more particularly, to low melting point plutonium alloys useful as liquid reactor fuels.

In a neutronic reactor operational flexibility of the reactor system is dependent upon the flexibility of control of the reactor, including reactor heat removal and reworking of the fuel. Liquid fuels have the further advantage that any portion of the spent or partially spent fuel may be replaced by an equivalent amount of new fuel while the reactor is in operation, thereby allowing reprocessing of spent fuel and continuous reactor operation. Another advantage is that the configuration of the bulk of liquid fuels can be rapidly changed from a critical shape to a non-critical shape, thereby permitting quick shut-down of the reactor. This may be accomplished, for example, by flowing the liquid fuel into a sufficiently long thin tube or a sufficiently large flat pan so that a non-critical geometry is obtained. Liquid fuel reactors also obviate fuel element dimensional instability difficulties usually encountered with solid fuel reactors.

Utilization of plutonium as a reactor fuel enables the enhancement of fission power capabilities when the reactor is refueled by an integral, or associated, breeding cycle. Because of the high values of the capture-to-fission ratio of the thermal and epithermal neutron energies for the plutonium isotopes, a plutonium fueled reactor must be either a fast or a fast intermediate neutron spectrum device in order to obtain an appreciable breeding gain. In such a power producing reactor it is desirable to attain a large specific power (>500 watts/gram of fuel). Specific power is essentially a measure of the fuel inventory for a fixed output machine and is strongly dependent upon the design of the reactor heat-exchange mechanism. High specific power may be attained by either a high fuel dilution or an extremely efficient heat-transfer mechanism.

Plutonium metal melts at 640° C., a temperature that is somewhat high. In the field of liquid metal fuel neutronic reactors there has been a need for an alloy of plutonium having a melting point low enough to provide a plutonium liquid fuel, i.e., an alloy having a melting point about 200° C. lower than plutonium. While certain eutectics of binary plutonium alloys, such as those disclosed in the co-pending application of W. Chynoweth, filed July 19, 1955, Ser. No. 523,138, entitled "Plutonium Alloys," also assigned to the U.S. Government as represented by the Atomic Energy Commission, have suitable neutronic characteristics and lower melting points, these eutectics have relatively high plutonium contents, i.e., they do not dilute the fuel volumetrically to a great extent.

As indicated above, a high fuel dilution is desirable to attain a high specific power. In addition, high dilution of fuel results in lower power density (watts/cc. of fuel including diluent) and easier heat removal, thereby facilitating smaller temperature gradients with the concomitants of less corrosion, less thermal stress and shock, less fission product damage and possible higher fuel conductivity. Hence, further experimentation resulted in the discovery of the practicability of certain ternary plutonium alloy systems, such as those disclosed in my co-pending application Ser. No. 749,304, entitled "Plutonium - Cerium - Cobalt and Plutonium - Cerium-Nickel Alloys" filed July 17, 1958, also assigned to the U.S. Government as represented by the Atomic Energy Commission. Unlike the aforementioned eutectics of binary plutonium alloys, these ternary plutonium alloys are a series of compositions lying substantially along the bottom of a eutectic valley found to exist in each of the ternary systems. Each of these ternary alloys, while providing low melting point diluted reactor fuels which do not excessively corrode the fuel container, contain an element which is capable of chemically combining with the preferred tungsten and tantalum container materials to form a compound.

It is therefore an object of the present invention to provide low melting point plutonium alloys.

Another object of the present invention is to provide low melting point reactor fuels.

Yet another object of the present invention is to provide low melting point diluted plutonium alloy reactor fuels compatible with the fuel container.

The series of alloys of the present invention are based upon the plutonium-cerium-copper ternary system. It has been found that copper does not chemically combine with either tantalum or tungsten to form compounds. In addition, plutonium and cerium form no intermetallic compounds with each other and, since there are eutectics in both the plutonium-copper and the cerium-copper binary systems, there exists a eutectic valley in the plutonium-cerium-copper ternary system extending from the plutonium-copper binary eutectic at 2 atomic percent copper and 625° C. to the cerium-copper binary eutectic at 28 atomic percent copper and about 415° C. (from 98 a/o plutonium, 0 a/o cerium, 2 a/o copper at 625° C. to 0 a/o plutonium, 72 a/o cerium, 28 a/o copper at 415° C.). Nowhere along this valley can the eutectic temperature be greater than the higher of the two terminal binary eutectics, namely, 625° C. The exact course of this valley is unknown; however, for given proportions of plutonium and cerium within the above-defined limits, the proportion of copper necessary to form the alloy situated at the bottom of the eutectic valley is easily determined by thermal analysis methods well known in the art.

The alloys along that portion of the eutectic valley near the plutonium-copper binary eutectic (high percentage content of plutonium) have melting points that are somewhat higher than desirable for a low melting point reactor fuel. However, as pointed out above, a reactor fuel having a relatively low plutonium content is desirable to attain a high specific power. Hence, attention is centered on those alloys along that portion of the eutectic valley nearer the cerium-copper binary eutectic (low percentage contents of plutonium), these alloys providing the desired lower melting point reactor fuels. My experimental results indicate that the plutonium alloys along the bottom of the eutectic valley and containing not more than 50 atomic percent plutonium will have melting ranges not in excess of 500° C. My experimental results further indicate that plutonium alloys containing anywhere from 10 to 30 atomic percent copper with the remainder consisting of plutonium and cerium in any desired proportion, and with the plutonium not in excess of 50 atomic percent, will be situated sufficiently close to the bottom of the eutectic valley so that the alloys will begin to melt at about 475° C. or lower and should be completely molten at a temperature not in excess of 500° C. For example, an alloy with 30 a/o plutonium, 20 a/o copper and 50 a/o cerium gave a strong thermal arrest at 430° C. and indications were that melting was substantially completed at 450° C.

The use of cerium as a diluent meets the stringent requirements for reactor fuels since cerium is one of the few metals having the desired neutronic compatibility, radiation stability and ease of alloying with plutonium. Hence, liquid plutonium alloy fuels containing any desired amount of plutonium up to 50 atomic percent, and therefore practically any desired high degree of dilution with melting temperatures not higher than 500° C., can be prepared from the plutonium-cerium-copper system in accordance with the teachings of the present invention. These liquid plutonium alloy fuels, unlike the prior art plutonium ternary alloys, contain no element which is capable of chemically combining with the commonly used tantalum and tungsten container metals.

Since it is reasonable to postulate that other group $I_B$ metals (gold and silver) do not form intermetallic compounds with tantalum or tungsten and, since it is known that gold and silver form binary eutectics both with plutonium and cerium, it is to be expected that they also would provide fuels having the desired characteristics of the fuels of the present invention. Lanthanum and praseodymium also form binary eutectics with copper, silver and gold that are similar to the copper-cerium binary eutectic, hence it is to be expected that all lanthanide series elements (including lanthanum), either separately or in combination, could be used as a diluent in place of cerium.

When the alloys of the present invention are utilized as liquid fuel in a neutronic reactor, an auxiliary heating apparatus may be provided for premelting the alloys. Once in use in a critical reactor region, the alloy will be kept in liquid form by the heat of the nuclear reaction.

The plutonium used in the alloys of the present invention is at least 98 to 99% pure and does not contain significant amounts of neutron-absorbing elements. Although a plutonium of lesser purity could be used if the impurities were not neutron-absorbing elements, the purities specified are easily achieved and generally expected in the reactor art. The alloying metals must be of a correspondingly high neutronic and chemical purity.

To prepare any of the alloys of the present invention a magnesium oxide or other suitable crucible is arranged in a conventional vacuum furnace heated by resistance elements or by an inductive coil connected to an induction furnace circuit. The alloying metals in chunk or button form are usually placed in the crucible first since they are lighter than plutonium. Then chunks or buttons of plutonium are added. Since the plutonium is the heavier element, when melted it will tend to flow through the alloying elements and mix with them. At room temperature, the vacuum within the furnace should be $10^{-4}$ mm., or better, of Hg. When the metal is melted, outgassing from the metal and crucible will degrade the vacuum to about $10^{-3}$ mm. to $5 \times 10^{-4}$ mm. of Hg. It has been found that mixing of the melted elements is faster if an induction type furnace is used. The range of 10 kc. to 5 mc. frequency is suggested and 500 kc. is very satisfactory. In order to melt the elements it is only necessary to raise the temperature of the mixture to the melting point of plutonium. However, to conserve time, the mixture is raised to about 1000° C. to 1200° C. In the preferred embodiment, after the mix has been in the melted state for a few minutes, the furnace is shut down and the alloy cools in the crucible. The crucible is then broken and the alloy slug recovered. It is recognized that an alloy shape could be cast within the furnace, if so desired. When small samples are prepared a concentrator ring well known within the art is placed inside the induction coil to concentrate the alternating current in the alloy in the necessarily small crucible. Because of the personnel hazard from the high alpha activity of the plutonium, all operations are carried on in protective hoods or through remotely controlled apparatus, as is well known in the art.

When plutonium alloys are used in a completely liquid fuel system, it is necessary to contain the liquid fuel with metals which are resistant to the corrosive characteristics of the fuel. It has been found that the elements tantalum and tungsten are, in general, very satisfactory from a corrosion point of view. It is recognized, however, that at the present state of metallurgical art tantalum is easier than tungsten to fabricate into fuel containers. Tantalum, having excellent corrosion resistance even under very high temperature (1300° C.) tests, has been most frequently used as the container metal for liquid plutonium alloy fuels. Tungsten has better corrosion resistance properties than tantalum, but as mentioned above, is more difficult to fabricate. As a container material, alloys of tantalum and tungsten are also possible, and it is realized that such alloys could have excellent corrosion resistance as well as good fabrication qualities. The liquid plutonium alloy fuels of the present invention are capable of being used in connection with tantalum, tungsten, or tantalum-tungsten alloy containers without chemical combination of a fuel element with the container materials to form a compound.

Thus, there have been described new, low melting point plutonium alloys suitable for use as diluted neutronic reactor fuels providing ultimate compatibility with tungsten and tantalum fuel containers.

What is claimed is:

1. In a homogeneous nuclear reactor the combination of a fuel container fabricated from at least one metal selected from the group consisting of tantalum and tungsten, and a quantity of liquid nuclear reactor fuel contained therein, said reactor fuel consisting essentially of from 10 to 30 atomic percent copper and the balance plutonium and cerium, with the plutonium not in excess of 50 atomic percent.

2. In a homogeneous nuclear reactor the combination of a tantalum container and a quantity of liquid nuclear reactor fuel contained therein, said reactor fuel consisting essentially of from 10 to 30 atomic percent copper and the balance plutonium and cerium, with the plutonium not in excess of 50 atomic percent.

3. In a homogeneous nuclear reactor the combination of a tungsten container and a quantity of liquid nuclear reactor fuel contained therein, said reactor fuel consisting essentially of from 10 to 30 atomic percent copper and the balance plutonium and cerium, with the plutonium not in excess of 50 atomic percent.

No references cited.